United States Patent [19]

Booth

[11] 4,116,295
[45] Sep. 26, 1978

[54] ELECTRICALLY OPERATED SEATBELT RETRACTOR

[76] Inventor: Frederick C. Booth, 930 Larchlea Dr., Birmingham, Mich. 48012

[21] Appl. No.: 735,307

[22] Filed: Oct. 26, 1976

Related U.S. Application Data

[63] Continuation of Ser. No. 659,172, Feb. 18, 1976, which is a continuation of Ser. No. 246,620, Apr. 24, 1972.

[51] Int. Cl.² .............................................. B60R 21/00
[52] U.S. Cl. .................................. 180/82 C; 280/744
[58] Field of Search .................... 280/744; 180/82 C; 297/388

[56] References Cited

U.S. PATENT DOCUMENTS

| | | | |
|---|---|---|---|
| 3,340,523 | 9/1967 | Whitman | 280/744 |
| 3,351,381 | 11/1967 | Boblitz | 280/744 X |
| 3,437,993 | 4/1969 | Reico et al. | 180/82 C |
| 3,438,455 | 4/1969 | Redmond | 180/82 C |
| 3,449,714 | 6/1969 | Farley | 180/82 C |
| 3,610,361 | 10/1971 | Pringle | 180/82 C |
| 3,713,506 | 1/1973 | Lipschultz | 180/82 C |
| 3,729,059 | 4/1973 | Redmond | 180/82 C |
| 3,784,972 | 1/1974 | Hults | 180/82 C |
| 3,804,192 | 4/1974 | Takada | 180/82 C |
| 3,807,522 | 4/1974 | Becker | 180/82 C |

*Primary Examiner*—Joseph F. Peters, Jr.
*Assistant Examiner*—Terrance L. Siemens
*Attorney, Agent, or Firm*—Roger H. Criss; Ernest D. Buff

[57] ABSTRACT

An emergency-locking seatbelt retractor having a solenoid-operated, spring-biased lock connected to the vehicle's electrical system responsive to movement of an inertia sensitive device to automatically unlock the retractor when a seat switch is energized, irrespective of energization of the ignition circuit, and to automatically lock the retractor in response to various abnormal vehicle operating conditions.

5 Claims, 13 Drawing Figures

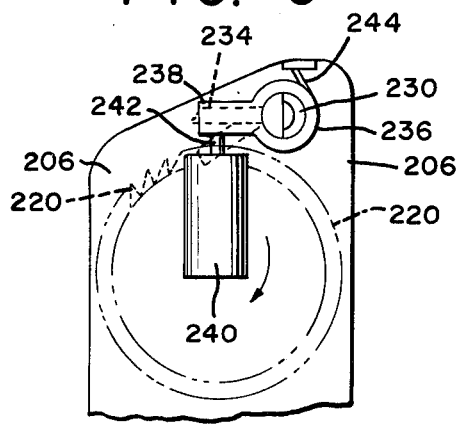
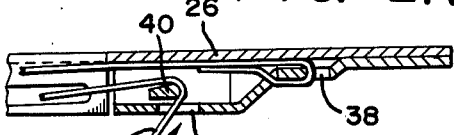
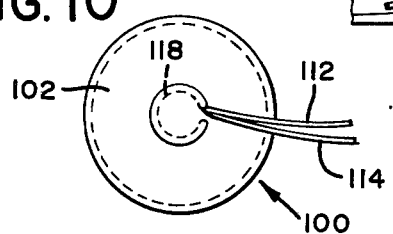
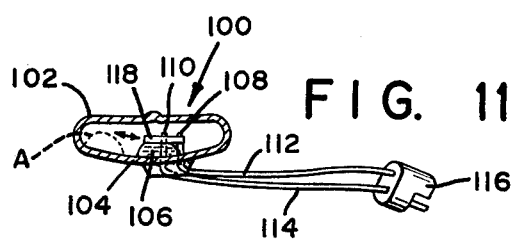

ELECTRICALLY OPERATED SEATBELT RETRACTOR

This is a continuation of application Ser. No. 659,172, filed Feb. 18, 1976, which in turn is a continuation of application Ser. No. 246,620, filed Apr. 24, 1972.

BACKGROUND OF THE INVENTION

This invention relates to safety seatbelt systems, and more particularly to a retractor system having electrical means for automatically unlocking a seatbelt retractor to allow the belt to be freely extended by the occupant before and during normal vehicle operating conditions upon occupancy of the seat at which the seatbelt is employed, but which automatically locks the retractor to prevent belt extension in response to certain abnormal vehicle conditions.

Emergency locking vehicle seatbelt systems of the prior art allow an occupant of the belt to perform normal body motions within the vehicle in a relatively unrestrained manner because the seatbelt can be freely extended and retracted to accommodate his motions. A retractor locking mechanism, or some other means operable to prevent belt extension, is provided for automatically preventing belt extension in response to an abnormal vehicular condition, such as a sudden acceleration, or deceleration, or an abnormal vehicle orientation. These conditions are normally associated with an accident in which it is desirable to restrain the vehicle's occupant against a sudden change in position within the passenger compartment of the vehicle.

Usually prior art automatic locking mechanisms employ some form of mechanical device for automatically locking or unlocking the retractor in response to a predetermined change in motion of either the vehicle or of the belt. A few automatic locking retractors of the prior art employ an electrical actuator such as a solenoid for locking or unlocking the retractor. The problem is that it is necessary for the locking mechanism to be locked in response to an abnormal condition. This abnormal condition could occur simultaneously with a failure of the vehicle's electrical system which would deenergize the solenoid.

A system utilizing a solenoid has been disclosed in U.S. Pat. No. 3,610,361. In that system, the retractor is normally unlocked to allow belt extension. The solenoid unlocks the retractor when the ignition circuit is energized to allow the user to adjust the length of the belt, so adjustment of the belt cannot be made until after ignition.

SUMMARY OF THE INVENTION

The broad purpose of the present invention is to provide an emergency-locking seatbelt retractor having an electrically actuated lock that is automatically unlocked as the occupant sits in the seating position, and automatically locked in response to certain predetermined vehicular conditions. Two embodiments of the invention are disclosed. One is in the form of a rotary retractor that is suited for mounting on the vehicle's floor. The other is in the form of a novel linear retractor that is adapted for mounting in other portions of the vehicle, as in the seat back where only a relatively flat storage space is available.

Either embodiment can be operated by the preferred electrical circuit which includes a solenoid and a movable retractor locking member. The locking member is spring biased toward its locking position. The solenoid is connected to the locking member such that, upon being electrically energized, it moves the locking member toward its release position. The solenoid is energized concurrently with the occupant taking a seating position to utilize the particular seatbelt concerned, causing energization of an electrical circuit to allow the user to connect the belt about his body and perform body motions in a relatively unrestrained manner while the vehicle is being operated.

The circuit includes various sensing devices for detecting an abnormal vechicle condition to automatically deenergize the solenoid. When the solenoid is deenergized, the locking member snaps into its locking position to prevent belt extension. When the vehicle resumes its normal motion or orientation, the solenoid is again automatically energized after a predetermined time period to unlock the retractor.

Devices for deenergizing the solenoid include a mercury switch which is responsive to either a sudden change in vehicle momentum as an abrupt acceleration or deceleration. Another device for deenergizing the solenoid comprises a connection between the solenoid's circuit and the vehicle's braking system. The connection includes a switch that is automatically opened in response to a predetermined hydraulic pressure associated with the vehicle being suddenly braked, or as a result of simple application of the foot to open a switch actuated by movement of the brake pedal, for example.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 2A is a view showing the manner in which the belt is anchored to the retractor.

FIG. 9 is a schematic view showing the motion of the locking member of the rotary retractor between its locking and its release positions;

FIG. 10 is a plan view of a mercury switch; and

FIG. 11 is a sectional view of the mercury switch of FIG. 10.

DESCRIPTION OF THE PREFERRED EMBODIMENTS

Figure 1:
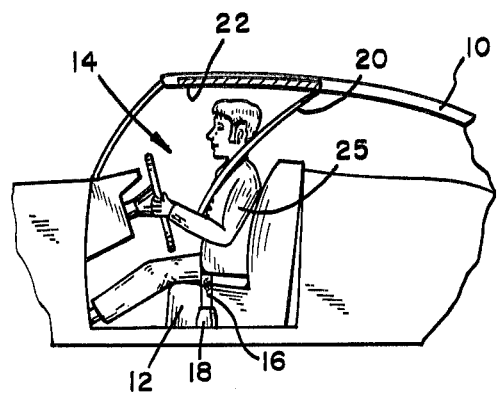
FIG. 1 is a view of a vehicle incorporating a preferred emergency-locking linear retractor mounted in the overhead portion of the vehicle's passenger compartment.

Now referring to the drawings, FIG. 1 illustrates a vehicle 10 having a conventional seat assembly 12 in the vehicle's passenger compartment. A safety seatbelt system, generally indicated at 14, is mounted adjacent the seat assembly 12 and includes a lap belt 16 connected to a floor mounted retractor 18, and a shoulder belt 20 connected to an overhead mounted linear retractor 22. The lap belt 16 and shoulder belt 20 form part of a restraining system for an occupant 25 of the seat assembly 12. The seat belt system 14 allows the occupant 25 to perform various body motions within the passenger compartment of the vehicle at such times as the vehicle is in an operating condition, but in response to various abnormal vehicle conditions, the system 14 restrains the occupant 25 from suddenly being displaced from his seated position.

Figure 4:
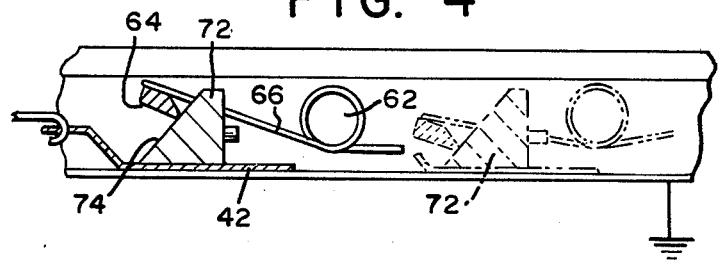
FIG. 4 is a view showing the locking member in its unlocked and locked position in solid and dotted lines respectively.
Figure 5:
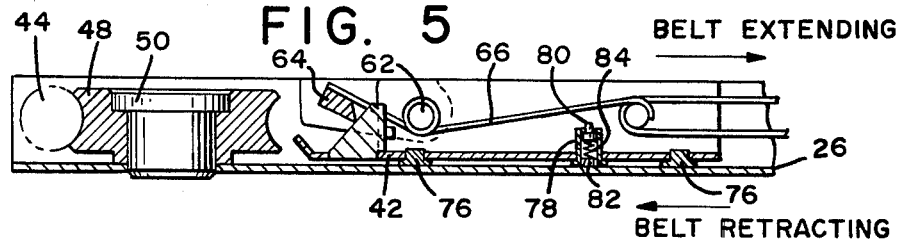
FIG. 5 is a view of the locking member in its release position.
Figure 6:
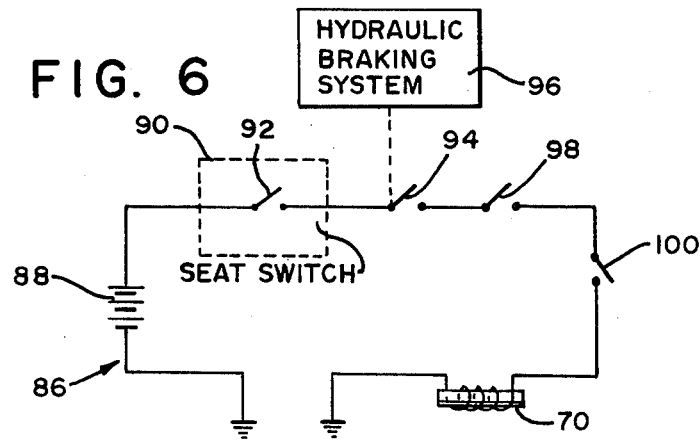
FIG. 6 is a schematic view of the preferred electrical circuit.

The mechanical components of the preferred retractor 22 are illustrated in FIGS. 1-5, and a preferred electrical circuitry for locking and unlocking the retractor is illustrated in FIG. 6. The retractor 22 includes an elongated metal housing 24 which is fixedly attached to an overhead portion of the vehicle 10, however it could be mounted in other positions within the vehicle such as in the back supporting portion of the seat assembly 12. The housing 24 is formed of a metal stamping with a generally channel-shaped cross section which includes a base 26 and a pair of upturned sides 28 and 30. Fastener means 32 attach the base of the housing to the vehicle's ceiling.

Figure 2:
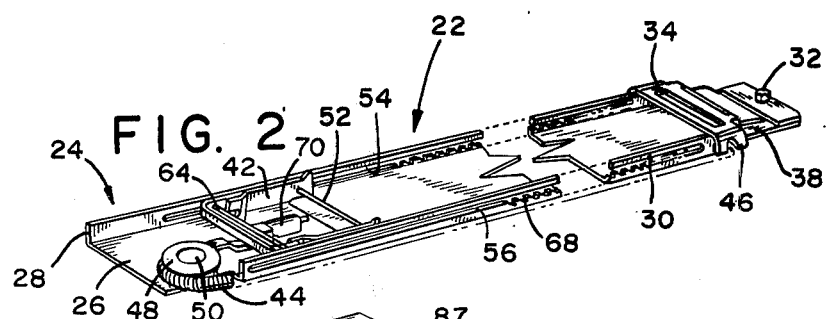
FIG. 2 is a perspective view of the preferred retractor upside down with respect to its normal mounting position on the vehicle's ceiling, and with a portion of the housing removed to show its internal components.

As best illustrated in FIGS. 2 and 2A, one end of the housing has an opening 34 for receiving the shoulder belt 20 toward a retracted position within the housing. The housing 24 also has an integrally formed anchor section 38 adjacent the opening 34. The inner end of the shoulder belt 20 is looped about the anchor member 38 and then stitched to itself to form a permanent connection. A bar 40, adjacent opening 34, provides means for guiding the belt as it is moved into and out of the housing.

A generally channel-shaped carriage 42 is slidably mounted between the sides 28 and 30 of the housing along a longitudinal path extending between opposite ends of the housing. An elongated retracting spring 44 has one end connected to the carriage 42 and its other end connected to a tab 46 that is adjacent the opening 34. A pulley 48 is rotatably mounted by a pin 50 to the housing so as to guide the spring between the end of the housing and its connection to the carriage 42. The bias of the spring urges the carriage 42 toward a fully retracted position in which it is adjacent the pulley 48.

A retractor bar 52 is carried at one end of the carriage 42. The shoulder belt 20 is looped around the retractor bar in such a manner that as the carriage 42 is moved toward the pulley 48 by the spring 44, the belt is retracted into the housing, and as the belt 20 is extended from the housing through the opening 34, it moves the carriage toward the opening 34 against the bias of the spring 44. In its fully retracted position, the belt is disposed in a pair of overlying linear folds within the housing. As the belt is extended through the opening 34, the carriage moves toward the opening to unfold the belt to accommodate belt extension.

The sides 28 and 30 of the housing have elongated slots 54 and 56, respectively, which extend substantially the major length of the housing. The ends of the retractor bar 52 extend through the slots 54 and 56 to guide the carriage along the housing.

A U-shaped member 58 is pivotally mounted at the other end of the carriage by a pair of pins 60 and 62 so that its midsection can be moved either toward or away from the base. A locking bar 64 is supported between the legs of the member 58 with its ends extending into the slots 54 and 56. The bar 64 is operable to function as a stop member to prevent belt extension. A spring 66 is mounted on the pin 62 and has one leg connected to the retractor bar 52 and its other leg connected to the locking bar 64 to bias the locking bar toward the base 26 and a locking position.

Each of the two slots 54 and 56 has a series of abutments 68 formed adjacent the base 26 which extend parallel to the path of motion of the carriage 42 between its fully retracted and fully extended positions. When the carriage 42 is in an intermediate position associated with a partially retracted position of the belt 20, the opposite ends of the locking bar 64 are engageable with the abutments 68 to lock the carriage against further motion toward its fully extended position. The spring 66 is operable to snap the locking bar into its locking position to engage it with the abutments.

Figure 3:
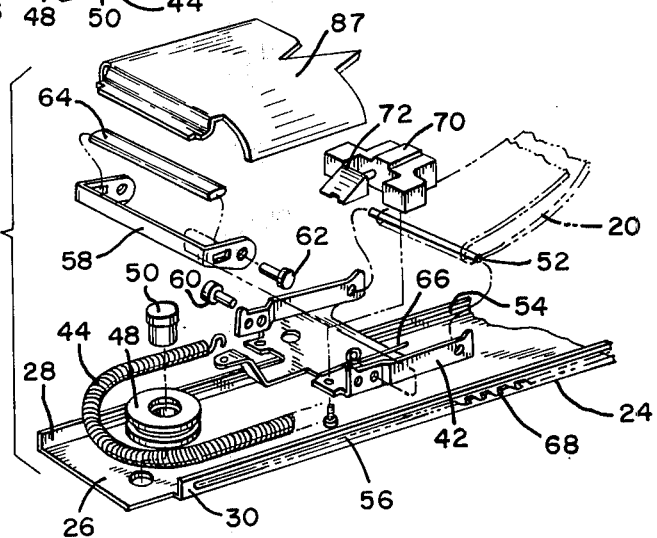
FIG. 3 is an exploded view of the retractor's carriage and locking components.

Referring to FIGS. 3, 4 and 5 an electrical solenoid 70, carried on the carriage 42, has a plunger 72 which is extended at such times as the solenoid is electrically energized, and retracted when the solenoid is deenergized. The plunger 72 has a cammed surface 74 engaged with the locking bar 64 in such a manner that when the plunger is extended, it biases the locking bar 64 toward its release position in which it is separated from the abutments 68. When the plunger is retracted, it allows the locking bar 64 to be moved from its release position toward its locking position by the spring 66.

Three plastic pads 76 (only two shown) mounted on the base of the carriage slidably support the carriage on the base 26 of the housing. A plastic tubular housing 78 also mounted on the base of the carriage 42, supports a copper connector 80 that extends beyond one end of the housing 78, and a copper brush 82 that is mounted adjacent the opposite end of housing 78. A spring 84, disposed between the connector 80 and the brush 82, biases the brush so that it is in continual sliding engagement with the base 26 as the carriage is moved along the retractor housing 24. The connector is wired in a conventional manner to the solenoid 70 to form part of a circuitry 86, as illustrated in FIG. 6, which connects the solenoid to the vehicle's battery 88. A cover 87 snaps on the housing 24 to enclose the internally mounted retractor components.

Thus it is to be understood that I have described the mechanical components of a novel linear seatbelt retractor having a carriage 42 movably disposed in the housing 24 between fully retracted and fully extended positions, and connected to the belt 20 to retract it toward the housing, or to allow it to be extended from the housing. The solenoid 70, when energized, retains the locking bar 64 in its release position so that the belt can be freely extended by the user. However, at such times as the solenoid is deenergized, the spring 66 biases the locking bar toward engagement with the abutments 68 to lock the retractor to prevent further belt extension.

Figure 6A:
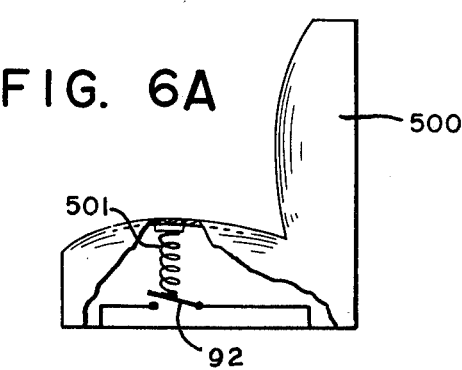
FIG. 6A shows one embodiment of a seat switch for use in the vehicle combination.
Figure 7:
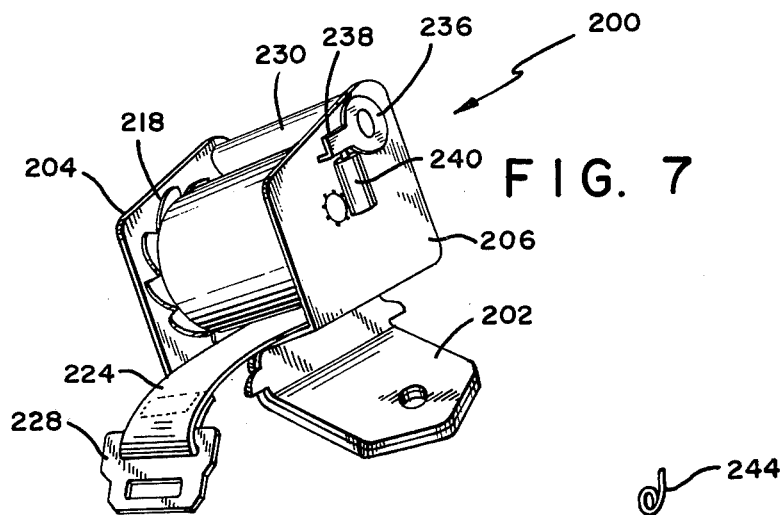
FIG. 7 is a perspective view of the invention embodied in a rotary retractor.
Figure 8:
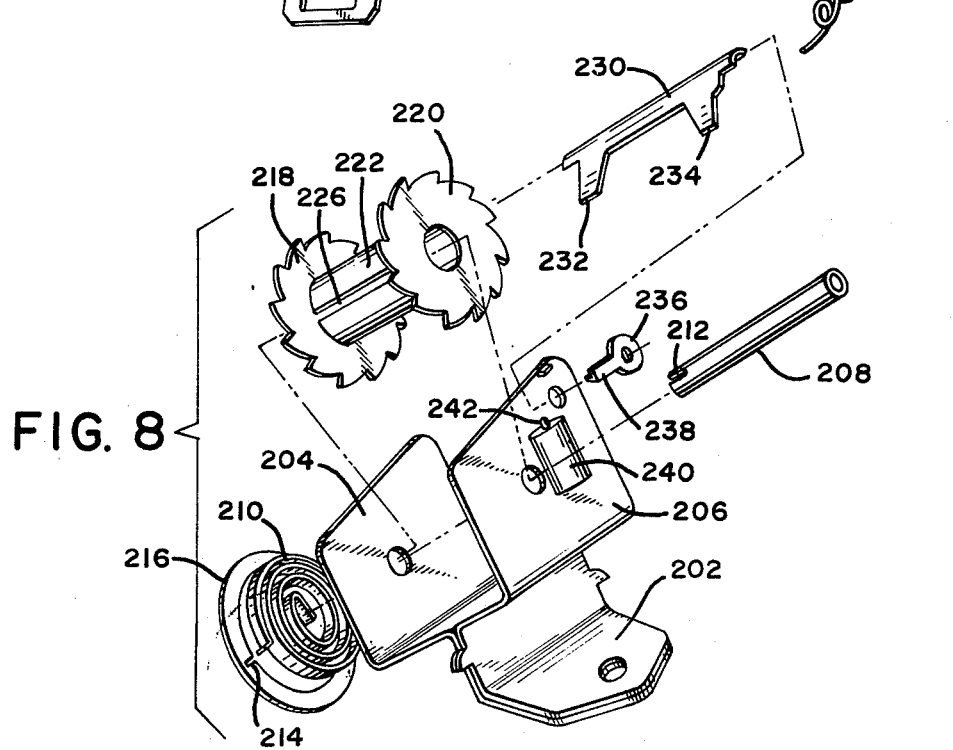
FIG. 8 is an exploded view of the rotary retractor of FIG. 7.

Now referring to FIG. 6, the preferred circuitry 86 for energizing and deenergizing the solenoid 70 is illustrated. The circuitry 86 is connected in a conventional manner to a vehicle's seat switch 90 which includes switch 92, which closes when the occupant of the seat to use the seatbelt occupies the seat. As seen in FIG. 6A, the occupant sitting in the seat 500 depresses the spring 501, in one embodiment, closing the switch 92. The circuitry 86 also includes a switch 94 that is connected to the vehicle's hydraulic braking system 96 in such a manner as to be opened to deenergize the solenoid 70 whenever the pressure in the circuit is increased to a predetermined level by the operator suddenly braking the vehicle in order to bring it to a sudden stop. Alternately, for example, the switch 94 may be opened on actuation of the vehicle brake pedal (not shown). A conventional time-delay switch 98 is also connected between the battery 88 and the solenoid 70 so that whenever the solenoid is deenergized, a predetermined time interval must pass before the solenoid can be reenergized. This is to avoid the possibility of a transient normal condition causing the retractor to be unlocked.

An inertia switch, such as a mercury switch 100 in one embodiment, is also connected between the battery 88 and the solenoid 70. The switch 100 is normally closed whenever the seat switch 90 is closed, but opens in response to the vehicle experiencing a sudden change in velocity, or assuming an abnormal orientation. Such an orientation can be produced by the vehicle being laterally tipped on its side. The mercury switch 100 is illustrated in detail in FIGS. 10 and 11.

In operation, the circuitry 86 connecting the solenoid to the battery 88 is normally open whenever the seat is not being occupied. The switches 94 and 100 are normally closed. Switch 98 is opened whenever the circuit is deenergized. When the switch 92 is open, the solenoid is deenergized. When the occupant sits in the seat and thus closes the switch 92, the time delay switch 98 is automatically closed after a predetermined interval to energize the solenoid 70 and move the locking bar 64 to its release position. This allows the belt 20 to be freely extended by the occupant 24. The belt remains free for extension to allow the occupant to move forwardly in the seat assembly 12. As he moves rearwardly, the spring 44 takes up any slack in the belt by moving the carriage 42 toward its fully retracted position.

In the event of an emergency, as reflected in either the braking system or in the inertia switch, the solenoid is automatically deenergized to retract the plunger 72 and allow the spring 66 to snap the locking bar into a pair of the abutments 68 to lock the carriage and the shoulder belt against further extension. The belt 20 is then operative to cooperate with the other belt components to provide a restraint on the occupant 24. If the vehicle resumes its normal operative condition, the solenoid is automatically reenergized to unlock the retractor until a subsequent abnormal condition occurs or the ignition circuit is deenergized.

Referring to FIGS. 10 and 11, the mercury switch comprises a closed, plastic housing 102 which is fixedly mounted on the vechicle. The base 104 of the housing has a dish-shaped configuration. A quantity of mercury 106 in the housing normally assumes a position of equilibrium in the center of the base 104. The mercury 106 moves toward the edge of the base 104 if the vehicle experiences a sudden change in momentum.

A pair of posts 108 and 110 are mounted adjacent the center of the base 104. The posts 108 and 110 are spaced from one another and are formed of an electrically conductive material to form a pair of switch elements. The post 108 is connected to a suitable lead 112 and the post 110 is connected to a lead 114. The two leads are connected to a coupling 116 for electrically connecting the mercury switch 100 to the circuit 86 of the solenoid.

The post 108 has an upper end 118 which is bent in a circular configuration to substantially encircle the post 110. Thus the mercury 106, in its position of equilibrium, contacts both of the posts 108 and 110 to make an electrical connection in the circuit. However, when displaced from the center of the base 104 as toward the position "A" in response to an abnormal change in vehicle momentum, in which the mercury becomes separated from either one or both of the posts, the electrical connection in the circuitry 86 is broken to deenergize the solenoid. If the vehicle resumes its normal vehicle motion, the mercury 106 returns toward its center position to make an electrical connection between the two posts.

FIGS. 7 to 10 illustrate another form of retractor 200 having a locking member that is connected to the circuitry 86 to automatically lock or unlock the retractor in response to predetermined vehicle conditions. The retractor 200 comprises a metal support 202 adapted to be mounted adjacent the floor of the vehicle. The support has a pair of spaced walls 204 and 206 rotatably journaling a windup shaft 208 which spans the two walls. A spiral windup spring 210 has one end connected to a slot 212 of the shaft 208 and its other end connected to a slot 214 of a housing 216 that is carried on the wall 204. The spring 210 biases the shaft 208 in the windup direction to retract a belt connected to the shaft, but allows it to be rotated in the opposite, unwind direction to accommodate belt extension.

A pair of circular ratchets 218 and 220 are fixedly carried on the shaft 208 and support a reel 222. A belt 224 is mounted on the reel 222 with its inner end passed through a slot 226 of the reel, wrapped around the shaft 208 and then sewn to itself to form a permanent loop and connection to the shaft. As the reel 222 is rotated with the shaft 208 in the winding direction, the belt is retracted and wound into a roll about the reel. The spring 210 functions to take up any slack in the belt 224 by urging the shaft toward its windup direction.

A conventional tongue 228 carried on the outer end of the belt 224 is engageable with a conventional seatbelt buckle (not shown) to form a continuous restraining element about the user in the conventional manner.

An elongated metal locking pawl 230 is pivotally supported between the walls 204 and 206, and has a pair of teeth 232 and 234 that are engageable with the teeth of the ratchets 218 and 220 to lock the reel against rotation in the unwind direction. A lever 236, carried on the outer end of the pawl 230, has a tab 238 which extends normal to the axis of the pawl's rotation. A solenoid 240, suited for electrical connection to the circuitry 86, is mounted on the wall 206 in such a manner that when electrically energized, a solenoid plunger 242 which is in abutment with the tab 238 is extended to rotate the locking pawl 230 toward its release position. In the pawl's release position, the teeth 232 and 234 are separated from the ratchets 218 and 220 and allow the reel 222 to be freely rotated in either its wind or unwind directions. When the solenoid 240 is electrically deenergized, the plunger 242 is retracted to allow a spring 244, mounted on the outer end of the locking pawl 230 to snap the pawl 230 toward its locking position in which the teeth 232 and 234 of the pawl engage ratchets 218 and 220, respectively, to prevent further belt extension.

Thus it is to be understood that I have described in detail two embodiments of a novel seatbelt system in which the belt retractor is automatically, electrically unlocked at such times as the associated seating position is occupied, automatically locked in response to various abnormal vehicle conditions to prevent belt extension as long as the condition exists, and then automatically unlocked a predetermined time interval after the abnormal condition has passed.

I claim:

1. In a vehicle having a seat, a source of electrical power, a seatbelt system, comprising:
    (a) a support;
    (b) a retractor member movable on the support in either a belt-extending direction, or a belt-retracting direction;
    (c) bias means for urging the retractor member in the belt-retracting direction;
    (d) a safety seatbelt connected to the retractor member so as to be retracted as the retractor member is moved in its belt-retracting direction, and to be extended as the retractor member is moved in its belt-extending direction;
    (e) a stop member mounted on the support for motion between a stop position in which it is operable to prevent belt extension, and a release position in which it is inoperable to prevent belt extension;
    (f) a bias member operable to urge the stop member toward its stop position;
    (g) an actuator connected to the stop member, and operable upon being electrically energized to move the stop member toward its release position, the actuator being inoperable when deenergized to prevent movement of the stop member;
    (h) circuitry means, independent of the ignition circuit of the vehicle, connected to the source of electrical power and to the actuator for energizing the actuator to allow belt extension, and for automatically deenergizing the actuator in response to a predetermined change in vehicle motion to prevent belt extension,
    (i) a seat switch in said seat located at a seating position and connected to said circuitry means by an electrical circuit independent of said ignition circuit, said circuitry means responsive to said seat switch, said seat switch responding to occupancy of the seating position, whereby said actuator is energized; and
    (j) time delay means associated with said circuit means for delaying energization of said actuator for a predetermined time interval after it has been deenergized.

2. The seatbelt system as defined in claim 1, said seat switch being closed upon occupancy of said seat position to complete said circuitry means and open upon said seat position being vacant to interrupt said circuitry means.

3. The seatbelt system as defined in claim 1 in which the circuitry means is operable to automatically deenergize the actuator in response to vacancy of said seat position.

4. The seatbelt system as defined in claim 3, further including a braking circuit, said braking circuit included in said circuitry means and operable to deenergize the actuator in response to actuation in said braking circuit.

5. In a vehicle having a seat, a source of electrical power, a seatbelt system, consisting of:
    (a) a support;
    (b) a retractor member movable on the support in either a belt-extending direction, or a belt-retracting direction;
    (c) bias means for urging the retractor member in the belt-retracting direction;
    (d) a safety seatbelt connected to the retractor member so as to be retracted as the retractor member is moved in its belt-retracting direction, and to be extended as the retractor member is moved in its belt-extending direction;
    (e) a stop member mounted on the support for motion between a stop position in which it is operable to prevent belt extension, and a release position in which it is inoperable to prevent belt extension;
    (f) a bias member operable to urge the stop member toward its stop position;
    (g) an actuator connected to the stop member, and operable upon being electrically energized to move the stop member toward its release position, the actuator being inoperable when deenergized to prevent movement of the stop member;
    (h) circuitry means, independent of the ignition circuit of the vehicle, connected to the source of electrical power and to the actuator for energizing the actuator to allow belt extension, and for automatically deenergizing the actuator in response to a predetermined change in vehicle motion to prevent belt extension, and
    (i) a seat switch in said seat located at a seating position and connected to said circuitry means by an electrical circuit independent of said ignition circuit, said circuitry means responsive to said seat switch, said seat switch responding to occupancy of the seating position, whereby said actuator is energized.

* * * * *

UNITED STATES PATENT AND TRADEMARK OFFICE
CERTIFICATE OF CORRECTION

PATENT NO. : 4,116,295
DATED : September 26, 1978
INVENTOR(S) : Frederick C. Booth It is certified that error appears in the above-identified patent and that said Letters Patent are hereby corrected as shown below:

On the first page of the patent, add as assignee,

ALLIED CHEMICAL CORPORATION, New York, NY

Signed and Sealed this

Twelfth Day of February 1980

[SEAL]

Attest:

SIDNEY A. DIAMOND

Attesting Officer — Commissioner of Patents and Trademarks